(12) United States Patent
Roberts et al.

(10) Patent No.: US 6,208,869 B1
(45) Date of Patent: Mar. 27, 2001

(54) MOBILE RADIO COMMUNICATING SYSTEM INCLUDING BOTH A PUBLIC SYSTEM AND AT LEAST ONE PRIVATE SYSTEM

(75) Inventors: Michaël Roberts, Neuilly S/Seine; Laurent Cruchant, Paris; François Courau, Meudon, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/309,877

(22) Filed: May 11, 1999

(30) Foreign Application Priority Data

May 12, 1998 (FR) .................................................. 98 05974

(51) Int. Cl.$^7$ ...................................................... H04Q 7/20
(52) U.S. Cl. .......................... 455/465; 455/426; 455/435; 455/450; 455/454; 455/462; 455/509; 455/517; 455/552; 455/553
(58) Field of Search ..................................... 455/462, 555, 455/554, 424, 426, 435, 450, 447, 517, 575, 509, 552, 553

(56) References Cited

U.S. PATENT DOCUMENTS

| | | | |
|---|---|---|---|
| 5,428,668 | 6/1995 | Dent et al. . | |
| 5,818,918 | * 10/1998 | Fujii | 455/462 |
| 5,898,929 | * 4/1999 | Haartsen | 455/462 |
| 5,926,760 | * 7/1999 | Khan et al. | 455/555 |
| 5,956,652 | * 9/1999 | Eriksson | 455/554 |
| 5,966,660 | * 10/1999 | Jonsson | 455/554 |
| 5,978,687 | * 11/1999 | Maenpaa | 455/555 |
| 5,999,813 | * 12/1999 | Lu et al. | 455/555 |
| 6,009,332 | * 12/1999 | Haartsen | 455/450 |

FOREIGN PATENT DOCUMENTS

| | | |
|---|---|---|
| 0 802 692 A2 | 10/1997 | (EP) . |
| WO 97/36437 | 10/1997 | (WO) . |

* cited by examiner

*Primary Examiner*—Lee Nguyen
*Assistant Examiner*—Simon Nguyen
(74) *Attorney, Agent, or Firm*—Sughrue, Mion, Zinn, Macpeak & Seas, PLLC

(57) ABSTRACT

A mobile radio communications system including a public system and at least one private system, and "multimode" mobile stations suitable for operating in either of said systems, in which the management of the radio resources of said at least one private system is integrated in that of said public system, the mobile radio communications system including means for conveying over a dedicated signaling channel allocated to a mobile station in cellular mode, information about radio resources allocated to said mobile station in private mode.

9 Claims, 2 Drawing Sheets

MOBILE RADIO COMMUNICATING SYSTEM INCLUDING BOTH A PUBLIC SYSTEM AND AT LEAST ONE PRIVATE SYSTEM

BACKGROUND OF THE INVENTION

Various types of mobile radio communication system are known, and they differ essentially in geographical coverage, in the services they offer, and in the cost of these services.

Thus, there are public systems, in general cellular systems, having relatively large geographic coverage (typically a region, a country, or a continent), making a relatively large amount of mobility possible, but giving rise to relatively high call costs.

In such public cellular systems, and as shown in FIG. 1, mobile stations MS are in communication with a cellular public land mobile network PLMN connected to external networks, and in particular the public switched telephone network PSTN, and including in conventional manner a base station subsystem BSS and a network and switching subsystem NSS. For a fuller description of a cellular system, such as the global system for mobile communications GSM in particular, reference can be made for example to the book by M. MOULY and M. B. PAUTET, entitled "The GSM system for mobile communications", (Palaiseau, France, 1992, ISBN: 2-9507190-07-7).

Private systems are also known having relatively small geographic coverage, allowing relatively little mobility, but also giving rise to relatively low call costs. Such private systems can themselves be either cordless systems of the kind typically used residentially, or systems of the kind typically used in offices, and in particular made up of minicells that are much smaller in size than the cells of public systems.

In such private system, and as also shown in FIG. 1, mobile stations MS are in communication with private base stations PBS, themselves directly connected to an external network such as the PSTN, in particular.

There exists a need to be able to use a single mobile station to access one or the other of such systems, i.e. the public system or the private system, either at the choice of the user, or else more automatically with selection being performed by the systems themselves. "Multimode" mobile stations have thus been developed, which can be more or less complex depending on which functions are suitable for sharing between public and private modes, and also depending on how complex the private base stations are.

The base stations can be greatly simplified by providing for a common frequency band for both systems.

Nevertheless, under such circumstances, a problem arises in that if the mechanisms for allocating radio resources in these various systems are not coordinated, then interference is likely to occur between systems in an overlap zone, thereby degrading call quality.

It is recalled that in a public cellular system such as that shown in FIG. 1, it is the BSS entity of the PLMN that controls allocation of radio resources. More precisely, the BSS selects these resources from a set of resources allocated to a given cell (applying principles for sharing resources between cells in a cellular system), with the given cell being selected or reselected in co-operation with the mobile station MS.

In contrast, in a private system, the radio resources are determined in cordless systems in a non-centralized manner for each base station and mobile station pair, and optionally implementing frequency hopping techniques in order to limit interference within the system; in practice systems other than cordless systems, radio resources are determined in a more centralized manner at the private base station, but the problem mentioned above of interference between systems remains unsolved.

One solution to that problem of interference between systems would be to reserve for each system a distinct portion of said common frequency band, or for better spectrum usage, to reserve within each cell of the public cellular system a set of frequencies for a private system located within the cell, said frequencies being unattributed in the public system for the cell and for the adjacent cells, but being suitable for reuse in cells that are further away.

Such fixed distribution is nevertheless not optimum when system reconfiguration becomes necessary, and in addition it does not constitute an effective way of sharing resources.

A better solution consists in integrating resource management of the private system(s) in that of the public system, i.e. to manage and allocate radio resources dynamically for the various possible modes of operation, private or public, of the mobile stations.

Such a solution also has the advantage of making centralized allocation of radio resources possible in a private system constituted by a cordless system, thereby avoiding interference within such a system more effectively.

Nevertheless, such a solution gives rise in turn to the problem of finding the best way of informing mobile stations of the resources that have been dynamically allocated to them in this way for use in private mode.

It can thus be envisaged that such information could be transmitted to private base stations via the PSTN. Such a solution nevertheless suffers from the drawback of being relatively complex to implement.

It can also be envisaged that such information could be transmitted to the mobile stations over a common channel (or broadcast channel) of the public system, for example the broadcast control channel BCCH of the GSM system, where said channel is carried by a so-called "beacon" frequency and is used to broadcast general information specific to the system.

Nevertheless, such a solution suffers from the fact that most of such broadcast channels are already reserved for other uses. Furthermore, it is liable to give rise to delays in implementing algorithms for selecting or reselecting cells as implemented by the mobile stations, particularly since these broadcast channels have relatively low repetition rates within the frame and multiframe structures used for conveying them, and that would degrade quality of service.

Document EP 0 802 692 describes a system in which such information is transmitted to mobile stations by means of the short message service SMS. Such a solution has the particular drawback of requiring specific resources to be allocated for such transmission, and thus in particular of making non-optimum use of the radio resources available.

OBJECTS AND SUMMARY OF THE INVENTION

A particular object of the present invention is to avoid those various drawbacks.

The present invention thus provides a mobile radio communications system including a public system and at least one private system, and "multimode" mobile stations suitable for operating in either of said systems, and in which the management of the radio resources of said at least one private system is integrated in that of said public system, the mobile radio communications system including means for reusing a dedicated signalling channel allocated to a mobile station in public mode for conveying information about radio resources allocated to said mobile station in private mode.

The present invention also provides a mobile station, and an entity for a mobile radio communications cellular system (in particular BSS for a network such as the GSM network) suitable for use in such a system.

BRIEF DESCRIPTION OF THE DRAWINGS

Other objects and characteristics of the present invention appear on reading the following description of an embodiment, said description being given with reference to the accompanying drawings, in which.

MORE DETAILED DESCRIPTION

The present invention thus provides a mobile radio communications system including a public system and at least one private system, and "multimode" mobile stations suitable for operating in either one of said systems, and in which management of the radio resources of said at least one private system is integrated in that of said public system.

In the invention, this system has means for reusing a dedicated signalling channel allocated to a mobile station in public mode for transmitting information about radio resources allocated to said mobile station in private mode.

In general, the term "multimode mobile station" is used herein to cover all possible levels of complexity for such a mobile station, from the case where the mobile station is merely the combination of a mobile station designed to operate in a public system and a mobile station designed to operate in a private system, to the case where such a multimode mobile station can be constituted by mobile station designed to operate in a public system (with the associated private base station then being modified relative to a private base station associated with a mobile station that is designed to operate in a private system, so as to integrate therein functions that are designed to reproduce, for said mobile station, functions of the cellular public network).

In addition, said information about radio resources allocated to the mobile station in private mode can include, in addition to the radio resources themselves, associated radio parameters such as, in particular the transmission power level (controlling transmission power level also serves in known manner to reduce interference).

In addition, in the case of a private system using the frequency hopping technique, said allocated resources comprise not just one frequency, but a set of frequencies.

Furthermore, said information about radio resources allocated to the mobile station in private mode can also include a beacon frequency for use by the private base station associated with said mobile station, for the case where the communications protocol between the mobile station and the base station includes the base station sending such a beacon frequency.

By way of example, in a cellular system such as the GSM system, said information about radio resources allocated to a mobile station in private mode can be carried in a dedicated signalling channel called the stand-alone dedicated control channel SDCCH, used for transmitting signalling information outside a call, for example during procedures for managing user mobility, or during the stages when calls are being set up or cleared down.

Figure 1:
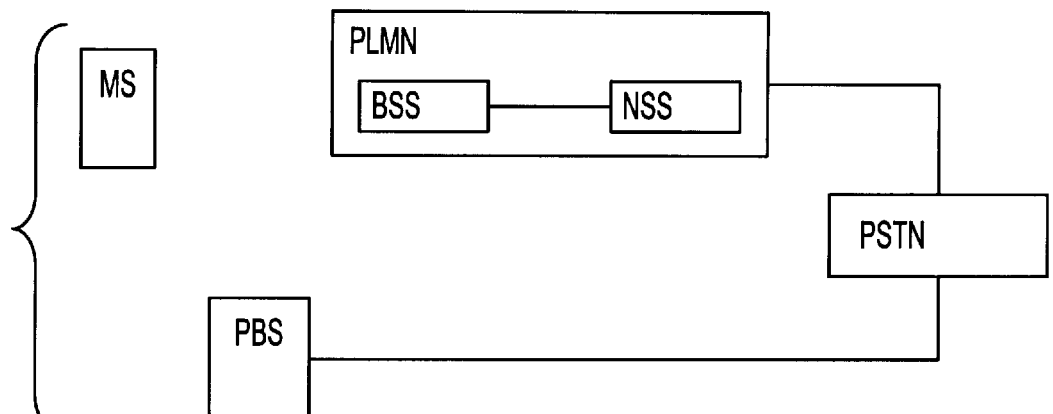
FIG. 1 is a diagram for illustrating a multimode mobile station suitable for operating in public mode or in private mode in a mobile radio communications system including a public system and at least one private system.
Figure 2:
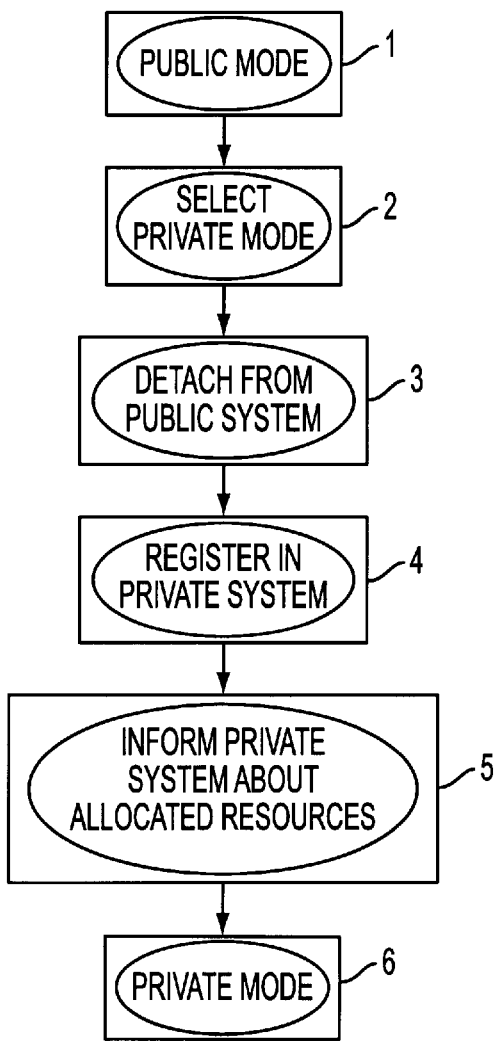
FIG. 2 is a diagram for illustrating an example of operation of a system of the invention.

Thus, in the example shown in FIG. 2, said information is transmitted during a special procedure for managing user mobility, constituted by a procedure for detaching the mobile station from the public system, which procedure is triggered by switching from public mode to private mode.

The method illustrated by FIG. 2 thus comprises, starting from an initial stage 1 corresponding to public mode operation, a step 2 during which it is detected whether private mode has been selected.

In general, private mode can be selected either manually by the user, or else can be determined in automatic manner, in particular by detecting the fact that the mobile station is within the coverage of the associated private base station.

Selecting private mode triggers a procedure for detachment from the public system (step 3).

The procedure for detachment from the cellular system serves essentially to avoid continuing to transmit pointlessly signalling messages to a mobile station over common signalling channels of the public system (in particular, in the GSM system, such as the paging channels PCH) while said mobile station is no longer operating in public mode. Such a procedure can be of the same type as the procedure known as "IMSI detach" as used in public systems such as the GSM system to avoid continuing to transmit such signalling messages when a mobile station has been deactivated. In this case, the procedure is triggered not by the mobile station being deactivated, but by the mobile station switching from public mode to private mode.

In accordance with the invention, in this example, step 3 further includes using the public network to inform the mobile station of the radio resources that have been allocated to it in private mode.

Advantageously, this information is transmitted in an allocated resource release message of said detachment procedure, and in particular in a cellular system such as the GSM system, such a message can be constituted by a so-called "channel release" message.

Selecting private mode also triggers a procedure whereby the mobile station is registered in the private system (step 4). Such a procedure can be of conventional type, as already used in such private systems, and it is therefore not described herein.

The diagram of FIG. 2 has a step 5 during which the mobile station in turn informs the associated base station of said information about radio resources allocated for private mode.

The diagram of FIG. 2 finally has a step 6 representing operation of the mobile station in private mode.

Other embodiments are naturally possible. Said information about radio resources allocated for private mode could thus be conveyed during procedures other than such a procedure for detachment from the public system, in particular:

a procedure for registering in the public system;

a procedure for updating location in the public system; or a procedure for setting up or clearing down a call in public mode.

Nevertheless, the procedure described above, compared with those listed, has the advantage of causing said information about radio resources to be sent to the mobile station substantially at the moment when it is likely to use them.

Said information about radio resources allocated for non-cellular mode could also, even though this is likewise less advantageous, be conveyed in dedicated signalling channels such as the slow associated control channel SACCH or the fast associated control channel FACCH in the GSM system, for example, which channels are used for transmitting signalling information during a call in public mode.

Figure 3:
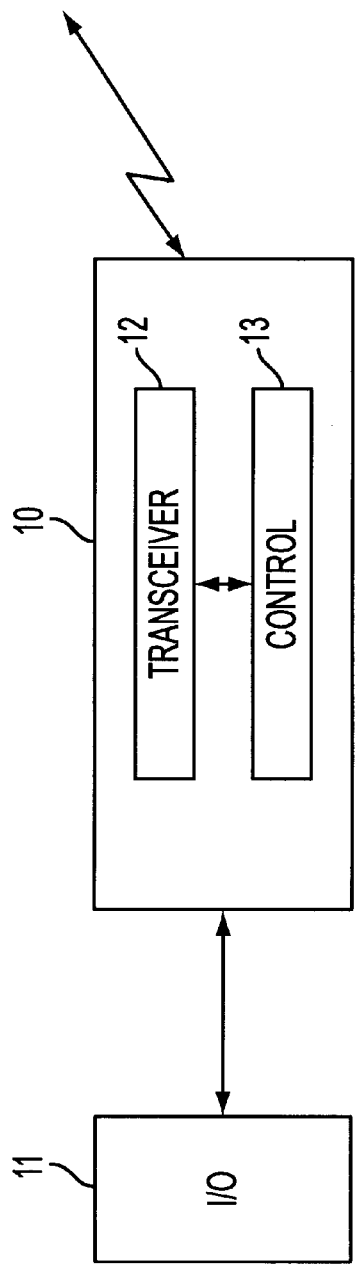
FIG. 3 is a diagram for illustrating the type of means to be provided in a mobile station in a system of the invention.

FIG. 3 is a diagram for illustrating the type of means that need to be provided in a mobile station in a system of the invention.

As outlined in FIG. 3, a mobile station includes in conventional manner so-called "air interface" means 10 serving:

firstly to put the information from the man/machine interface means 11 into a form that is suitable for transmission over the air interface; and secondly to deliver information received over the air interface for forwarding to said man/machine interface means 11.

The air interface means 10 themselves comprise, in conventional manner, transceiver means 12 including base-band processing functions and radio functions, and control means 13.

Said control means 13 serve in particular to transmit and receive the various signalling messages that are interchanged between the mobile station and the public system in the various procedures or protocols designed for operation in public mode. In particular, in the example of operation illustrated by FIG. 2, said control means 13 make it possible to transmit and receive the various signalling messages interchanged between the mobile station and the cellular public network in the context of a communications procedure corresponding to this example of operation.

In accordance with the invention, said control means 13 further include means for receiving, over a dedicated signalling channel allocated to said mobile station in public mode, said information about radio resources allocated for private mode, and means for configuring the transceiver means 12 accordingly for said private mode.

The particular implementation of such means is not particularly difficult for the person skilled in the art, so such means do not need to be described herein in greater detail than in terms of function.

Figure 4:
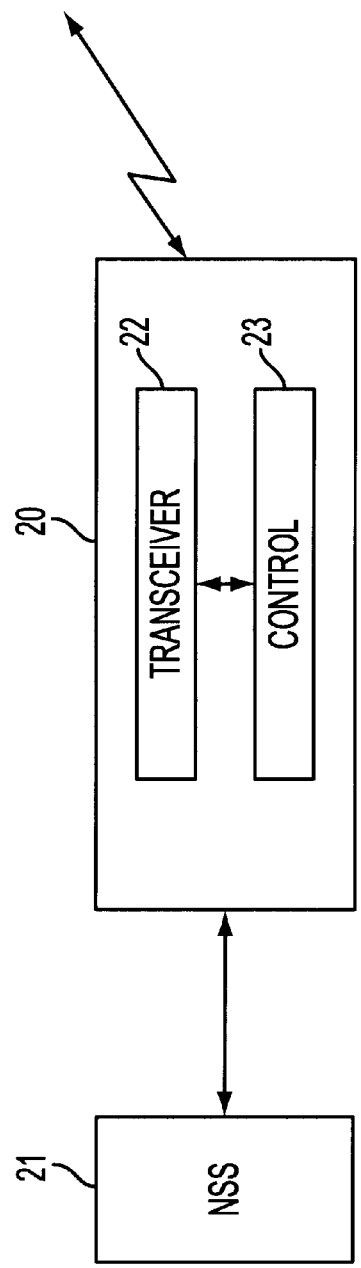
FIG. 4 is a diagram for illustrating the type of means to be provided in an entity of a mobile radio communications system (in particular a BSS for a system such as the GSM system), in a system of the invention.

FIG. 4 is a diagram for showing the type of means that need to be provided in an entity of the mobile radio communications cellular system (in particular a BSS for a system such as the GSM system), in a system that operates in accordance with the invention.

As outlined in FIG. 4, and in conventional manner, an entity such as the BSS entity has air interface means 20 serving:

firstly to put the information from a "higher level" entity 21 of the system in question (specifically the NSS entity) into a form suitable for transmission over the air interface; and secondly to deliver the information received over the air interface for forwarding to said higher level entity 21.

As described above for the mobile station, the air interface means 20 themselves comprise, in conventional manner, transceiver means 22 including baseband processing functions and radio functions, and control means 23.

Said control means 23 serve in particular to transmit and receive the various signalling messages that are interchanged between the mobile station and the cellular public network in the various procedures or protocols designed for operation in public mode. In particular, in the example of operation shown in FIG. 2, said control means 23 make it possible to transmit and receive the various signalling messages interchanged between the mobile station and the public cellular network in the context of a communications procedure corresponding to this example of operation.

In accordance with the invention, said control means 23 further include means for transmitting, over a dedicated signalling channel allocated to a mobile station in public mode, said information about radio resources allocated to said mobile station in private mode.

The particular implementation of such means likewise present no particular difficulty for the person skilled in the art, so such means do not need to be described herein in detail greater than in terms of function.

What is claimed is:

1. A mobile radio communications system including a public system, at least one private system, and a plurality of "multimode" mobile stations suitable for operating in either of said systems, wherein management of radio resources of said at least one private system is integrated in management of said public system, the mobile radio communications system including means for reusing a dedicated signaling channel, allocated to a mobile station of said plurality of mobile stations in public mode, for conveying information about radio resources allocated to said mobile station in private mode.

2. The mobile radio communications system according to claim 1, wherein said information is conveyed during a procedure for detaching the mobile station from the public system.

3. The mobile radio communications system according to claim 2, wherein said information conveyed during the procedure for detaching the mobile station from the public system is conveyed in a message for releasing resources allocated for said detachment procedure.

4. The mobile radio communications system according to claim 1, wherein said information is conveyed during a procedure for registering said mobile station in the public system.

5. The mobile radio communications system according to claim 1, wherein said information is conveyed during a procedure for updating the location of said mobile station in the public system.

6. The mobile radio communications system according to claim 1, wherein said information is conveyed during a procedure for setting up or clearing down a call in the public system.

7. The mobile radio communications system according to claim 1, wherein, in addition to the radio resources allocated to said mobile station in private mode, said information includes associated radio parameters, in particular concerning transmission power level.

8. The mobile radio communications system according to claim 1, said mobile station including means for receiving said information over a dedicated signaling channel allocated to said mobile station in public mode.

9. The mobile radio communications system according to claim 1, the mobile radio communications system including an entity for a public system, the entity including means for transmitting said information over a dedicated signalling channel allocated to a mobile station in public mode.

* * * * *